(12) United States Patent
Buer et al.

(10) Patent No.: US 8,085,743 B2
(45) Date of Patent: Dec. 27, 2011

(54) METHOD AND SYSTEM FOR ENABLING RENDERING OF ELECTRONIC MEDIA CONTENT VIA A SECURE AD HOC NETWORK CONFIGURATION UTILIZING A HANDHELD WIRELESS COMMUNICATION DEVICE

(75) Inventors: Mark Buer, Gilbert, AZ (US); Arya Behzad, Poway, CA (US); Jeyhan Karaoguz, Irvine, CA (US); Alexander MacInnis, Ann Arbor, MI (US); Thomas Quigley, Franklin, NC (US); John Walley, Ladera Ranch, CA (US)

(73) Assignee: Broadcom Corporation, Irvine, CA (US)

( * ) Notice: Subject to any disclaimer, the term of this patent is extended or adjusted under 35 U.S.C. 154(b) by 1067 days.

(21) Appl. No.: 11/873,918

(22) Filed: Oct. 17, 2007

(65) Prior Publication Data

US 2009/0022120 A1  Jan. 22, 2009

Related U.S. Application Data

(60) Provisional application No. 60/950,937, filed on Jul. 20, 2007.

(51) Int. Cl.
*H04Q 7/24* (2006.01)
*H04L 12/28* (2006.01)
*H04H 1/00* (2006.01)

(52) U.S. Cl. ....... 370/338; 370/389; 370/401; 455/3.01; 709/227

(58) Field of Classification Search ....... 370/310.1–401; 709/220–233; 455/3.01, 445; 380/270–273; 725/25–139
See application file for complete search history.

(56) References Cited

U.S. PATENT DOCUMENTS 7,203,486 B2   4/2007 Patel
2003/0210787 A1* 11/2003 Billhartz et al. .............. 380/270

FOREIGN PATENT DOCUMENTS

WO   WO2005/078676 A2   8/2005

OTHER PUBLICATIONS

UCAN: A Unified Cellular and Ad-Hoc Network Architecture, Ramjee et al., 2003 (NPL included).*
Seagate Technology LLC, Seagate D.A.V.E. (Digital Audio Video Experience) Transform the consumer digital content experience with the Seagate D.A.V.E design concept, Data Sheet, 2007.
Seagate Technology LLC, Seagate D.A.V.E. (Digital Audio Video Experience) The portable storage platform that collects, plays and manages digital content, Product Overview, 2007.

* cited by examiner

*Primary Examiner* — Afsar M. Qureshi
(74) *Attorney, Agent, or Firm* — McAndrews, Held & Malloy, Ltd.

(57) ABSTRACT

An ad hoc network enabled to handle secure data may be created for a specified user via a handheld wireless communication device (HWCD) such that rightful access to protected data stored on one or more networked devices may be extended to one or more distributed rendering devices. The HWCD and/or the user may be authenticated. The HWCD may enable configuration of one or more dynamic connections on the ad hoc network as needed until communication of data is complete. Bandwidth and throughput of one or more communication links may be adjusted according to bandwidth availability. The data may be buffered via the HWCD and/or one or more of the distributed rendering devices. Processing data tasks may be assigned to one or more networked resources on the ad hoc network. The data may undergo format conversion and be consumed on the one or more distributed rendering devices and/or the HWCD.

33 Claims, 4 Drawing Sheets

METHOD AND SYSTEM FOR ENABLING RENDERING OF ELECTRONIC MEDIA CONTENT VIA A SECURE AD HOC NETWORK CONFIGURATION UTILIZING A HANDHELD WIRELESS COMMUNICATION DEVICE

CROSS-REFERENCE TO RELATED APPLICATIONS/INCORPORATION BY REFERENCE

This application makes reference to and claims priority to U.S. Provisional Application Ser. No. 60/950,937 which was filed on Jul. 20, 2007 and which is hereby incorporated herein by reference.

FIELD OF THE INVENTION

Certain embodiments of the invention relate to communication of information. More specifically, certain embodiments of the invention relate to a method and system for enabling rendering of electronic media content via a secure ad hoc network configuration utilizing a handheld wireless communication device.

BACKGROUND OF THE INVENTION

The field of wireless communication has seen dramatic growth the last few years. In today's world, most people use their mobile devices, be it cellular phones, PDA's, laptops, media players and/or other devices, for various purposes, business and personal, on a constant and daily basis. Increasingly, people are able to access information according to their individual choice. For instance people may select music or videos from an electronic media store of their choice and play them on portable devices. In addition, the Internet allows people to access news and information at a time convenient for them rather then at specified broadcast times. In addition, many wireless solutions have been introduced, and have made tremendous strides into everyday life.

For example, the use of Wireless Personal Area Networks (WPAN) has been gaining popularity in a great number of applications because of the flexibility and convenience in connectivity they provide. WPAN systems generally replace cumbersome cabling and/or wiring used to connect peripheral devices and/or mobile terminals by providing short distance wireless links that allow connectivity within very narrow spatial limits (typically, a 10-meter range). WPAN may be based on standardized technologies, for example Class 3 Bluetooth (BT) technology. While WPAN may be very beneficial for certain applications, other applications may require larger service areas and/or capabilities.

To satisfy such needs, other technologies have been developed to provide greater wireless service. Wireless Local Area Networks (WLAN) systems may operate within a 100-meter range, for example. In contrast to the WPAN systems, WLAN provide connectivity to devices that are located within a slightly larger geographical area, such as the area covered by a building or a campus, for example. WLAN systems are generally based on specific standards, for example IEEE 803.11 standard specifications, and typically operate within a 100-meter range, and are generally utilized to supplement the communication capacity provided by traditional wired Local Area Networks (LANs) installed in the same geographic area as the WLAN system.

Other wireless solutions have evolved from traditional land-based communication technologies. For instance, cellular phones have become just about an absolute necessity in today's world. While cellular technology was merely intended to add an element of mobility to the traditional telephony service, this technology has grown beyond that initial purpose. Many modern cellular technologies, including such technologies as GSM/GPRS, UMTS, and CDMA3000 may incorporate substantial data capabilities. Most of today's cellular services may include such features as text messaging, video streaming, web browsing . . . etc.

Some mobile devices have the capability to utilize one or more wireless technologies. For instance, WLAN systems may be operated in conjunction with WPAN systems to provide users with an enhanced overall functionality. For example, Bluetooth technology may be utilized to connect a laptop computer or a handheld wireless terminal to a peripheral device, such as a keyboard, mouse, headphone, and/or printer, while the laptop computer or the handheld wireless terminal may also be connected to a campus-wide WLAN network through an access point (AP) located within the building. Also, cellular technology may allow use of the mobile phone as a form of wireless modem that allows connecting a laptop, for example, to the internet via a cellular network.

In short, wireless networks may exist to support mobile wireless devices. However, while mobile wireless devices have continued to grow in complexity and capability, these devices still continue to suffer from some major limitations, especially physical limitations and power.

Just as with other electronic devices, the mobile wireless devices have seen substantial growth in performance capability and speed. As such, they are finding applications in areas not predicted when first introduced to give users mobile telephony. They may comprise mini computers, multimedia players, GPS devices and many other applications, for example. As a result of the growth in performance, more and more applications are being added to wireless devices, thereby increasing complexity.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for enabling rendering of electronic media content via a secure ad hoc network configuration utilizing a handheld wireless communication device substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for enabling rendering of electronic media content via a secure ad hoc network configuration utilizing a handheld wireless communication device (HWCD). In this regard, the secure ad hoc network may comprise any suitable public or private access network enabled to handle data that may be protected, for example, encrypted data. Various embodiments of the invention may utilize a HWCD to enable a dynamic and secure ad hoc network that may comprise local and remote elements for a specified user. The dynamic and secure ad hoc network may comprise local elements such as, for example, a personal area network (PAN) and/or a wireless local area network (WLAN), as well as remote elements such as, for example, the specified user's home network, a service provider network and/or the internet. In this regard, the specified user of the HWCD may own or have a right to render electronic media content stored on the home network and/or the service provider network for example.

Access to information on the home and/or service provider network may be enabled according to the specified user's personal preferences. The specified user and the HWCD may be located within range of networked devices comprising suitable logic, circuitry and/or code to receive, render and/or buffer electronic media content. The specified user may utilize the HWCD to establish the dynamic and secure ad hoc network between the local networked devices via a PAN and/or a WLAN connection and the home or service provider network via a wide area network (WAN). The specified user may securely transfer electronic media content from the home or service provider network to the local networked resources and render the content on the local networked resource. The HWCD may be utilized as the local content rendering resource as well. In some embodiments of the invention, electronic media content that may be stored on a home network or a service provider network and may be protected by, for example, Digital Rights Management (DRM) or another access control technology, may be processed for display and approved for access on the home network or service provider network. In this regard, rather than directing the media content to an attached display, the home network or service provider network may direct or stream the media content via a network to the HWCD display or a display on another device.

Figure 1:
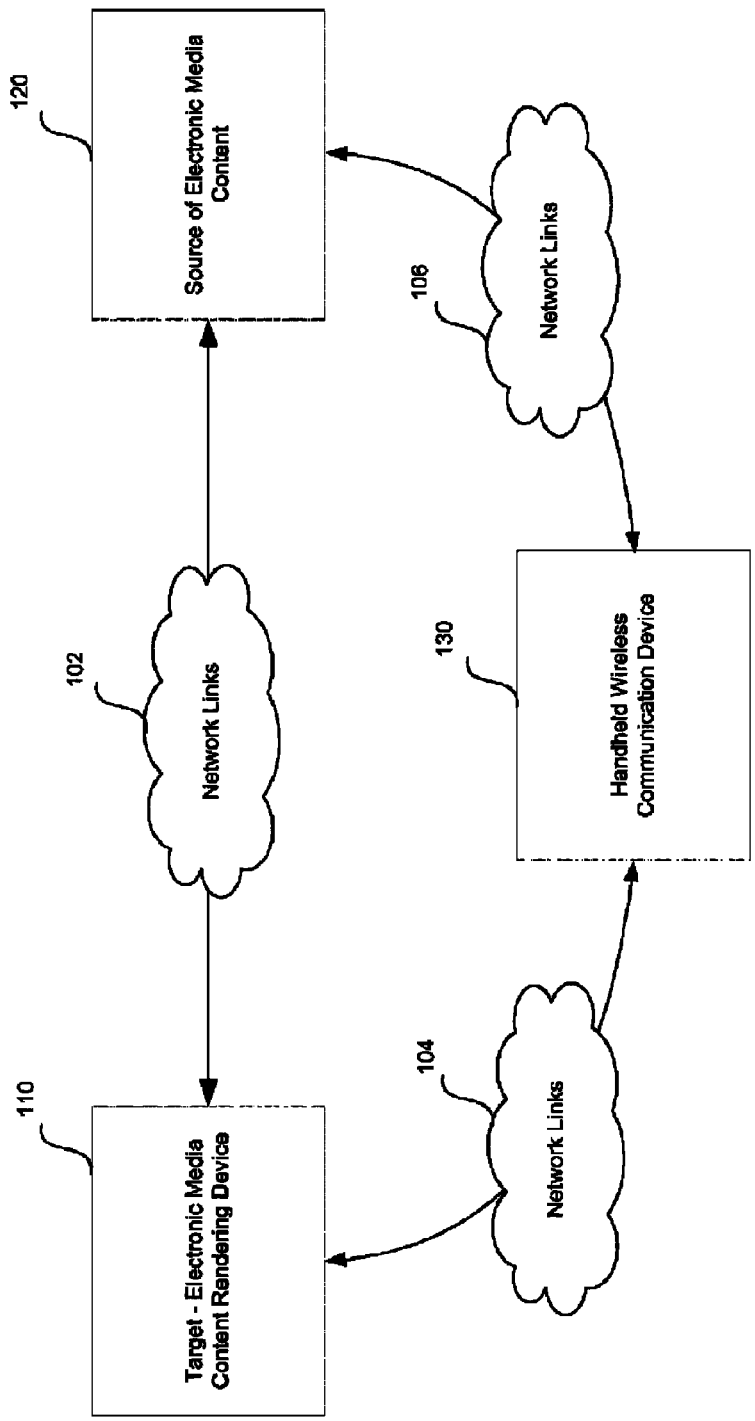
FIG. 1 is a block diagram of an exemplary ad hoc network enabled by a handheld wireless communication device.

FIG. 1 is a block diagram of exemplary dynamic and secure ad hoc network that may be utilized for transferring electronic media content, in accordance with an embodiment of the invention. Referring to FIG. 1, the exemplary dynamic and secure ad hoc network may comprise a source of electronic media content 120, a target electronic media content rendering device 110, a handheld wireless communication device (HWCD) 130 and network links 102, 104 and 106.

The source of electronic media content 120 may comprise suitable logic, circuitry and/or code to store electronic media and securely transfer the media over a network 102, 104 and/or 106. In one embodiment of the invention, the source of electronic media content 120 may be enabled to perform fast processing operations and/or store large amounts of data. For example, the source of electronic media content 120 may be enabled to perform data format translation and security operations such as data encryption and/or authentication. The source of electronic media content 120 may be enabled to adapt to dynamic network link requirements and/or capabilities by adapting data rates and protocol processes. In one embodiment of the invention, the source of electronic media content 120 may be a networked home computer or storage device comprising electronic media content that may be owned by a specified user and/or that the specified user has permission to gain access to. In another embodiment of the invention, the source of electronic media content 120 may be a networked service or account comprising electronic media that may be owned by the specified user and/or that the specified user has permission to gain access to. For example a service provider may allocate storage for a specified user.

The target electronic media content rendering device 110, may comprise suitable logic, circuitry and/or code to receive secure electronic media content via a wireless and/or wireline network connection and render it. In addition, the target electronic media content rendering device 110 may be suitable to buffer the electronic media content prior to rendering it. In one embodiment of the invention, the target electronic media content rendering device 110 may not be capable of fast processing of data for format translation and/or rate adaptation. In another embodiment of the invention the target electronic media content device 110 may be capable of performing format translation and/or rate adaptation.

The network links 102, 104 and 106 may comprise a plurality of interconnecting networks with suitable logic, circuitry and/or code that may enable end-to-end communication between the source of electronic media content 120, the HWCD 130 and the target electronic media content rendering device 110. In this regard, the network links 102, 104 and 106 may be a secure ad hoc network that may comprise any suitable public or private access network elements enabled to handle protected data such as encrypted data. In some embodiments of the invention, the electronic media content and corresponding signaling may be transferred from the source of electronic media content 120 via a WLAN to a WAN that may transport the electronic media content to a remote access point. The remote access point may transmit the electronic media content to the target electronic media content rendering device 110 and/or the handheld wireless communication device (HWCD) 130 via WLAN protocol. In addition, the HWCD 130 may be located within personal area network (PAN) range of the target electronic media content rendering device 110 and may communicate directly via a PAN link, for example a Bluetooth connection. In another embodiment of the invention, the target electronic media content rendering device 110 and HWCD 130 may be moving in a vehicle such as a car or plane. In this regard, the network link 104 may be a PAN connection while the network links 102 and 106 may comprise cellular links that are capable of base station hand-offs. For example, devices 110 and 130 may establish and re-establish signaling with one or more base stations according to their varying proximity, while sustaining communication with the source of electronic media content 120. Communication technologies utilized for network links 102, 104 and 106 are not limited to those mentioned here. Any communication protocol suitable for voice, video and/or audio data communication may be utilized.

The handheld wireless communication device (HWCD) 130 may comprise suitable logic, circuitry and/or code to establish secure network connections with the source of electronic media content 120 and the target electronic media content rendering device 110 via the network links 102, 104 and 106. The HWCD and/or the specified user may be authenticated by the source of electronic media content 120 prior to data retrieval. The HWCD 130 may be capable of biometric scanning and interpretation. Biometric scanning may be utilized to acquire physiological and/or behavioral information. The HWCD 130 may comprise an end user device or an end user terminal device comprising a user interface.

The HWCD 130 may comprise a plurality of radio technologies and computing platforms, for example the HWCD 130 may comprise a cellular phone, smart phone, wireless personal digital assistant (PDA), and/or personal computer with FM, Bluetooth, WLAN, GPS and/or RFID radio technology capabilities.

The HWCD 130 may operate within local or remote range of the source of electronic media content 120. The HWCD 130 may be enabled to establish a secure PAN, WLAN, WAN or another type of communication link and discover local resources, for example the target electronic media content rendering device 110. The HWCD may be enabled to function as a portable router and/or a mobile wireless cable modem, establishing communication links and assigning resources for processing electronic media content data. The HWCD 130 may initiate connections with the source of electronic media content 120 and the target electronic media content rendering device 110 and may dynamically establish new links when communication is disrupted or a mobile device moves out of range of a link. The HWCD 130 may be enabled to render media content from the source of electronic media content 120 as well. Security operations, for example encryption, are not limited to a specific type and may comprise any suitable methods.

In operation, a specified user may utilize an HWCD 130 to retrieve electronic media content from the source of electronic media content 120. The specified user may own or have permission to access the electronic media content. The HWCD 130 may discover local resources comprising the target electronic media content rendering device 110 and establish a dynamic and secure ad hoc network comprising local resources and remote resources. The HWCD may modify or establish new network links to sustain content retrieval in a changing network environment. The HWCD 130 may assign processing tasks for example data format translation, rate adaptation and/or security operations to available remote and/or local resources. The remote and/or local resources may buffer data, utilize multiple streams and/or reach-ahead to expedite the transmission of data as afforded by available network bandwidth. The user may then play the electronic media content on a local target electronic media content rendering device 110 via control of the HWCD 130. In some embodiments of the invention, electronic media content that may be stored on the source of electronic media content 120 and may be protected by, for example, Digital Rights Management (DRM) or another access control technology, may be processed for display and approved for access on the source of electronic media content 120. In this regard, rather than directing the media content to an attached display, the source of electronic media content 120 may direct or stream the media content via a network to the HWCD 130 display or the display of the target electronic media content rendering device 110.

Figure 2A:
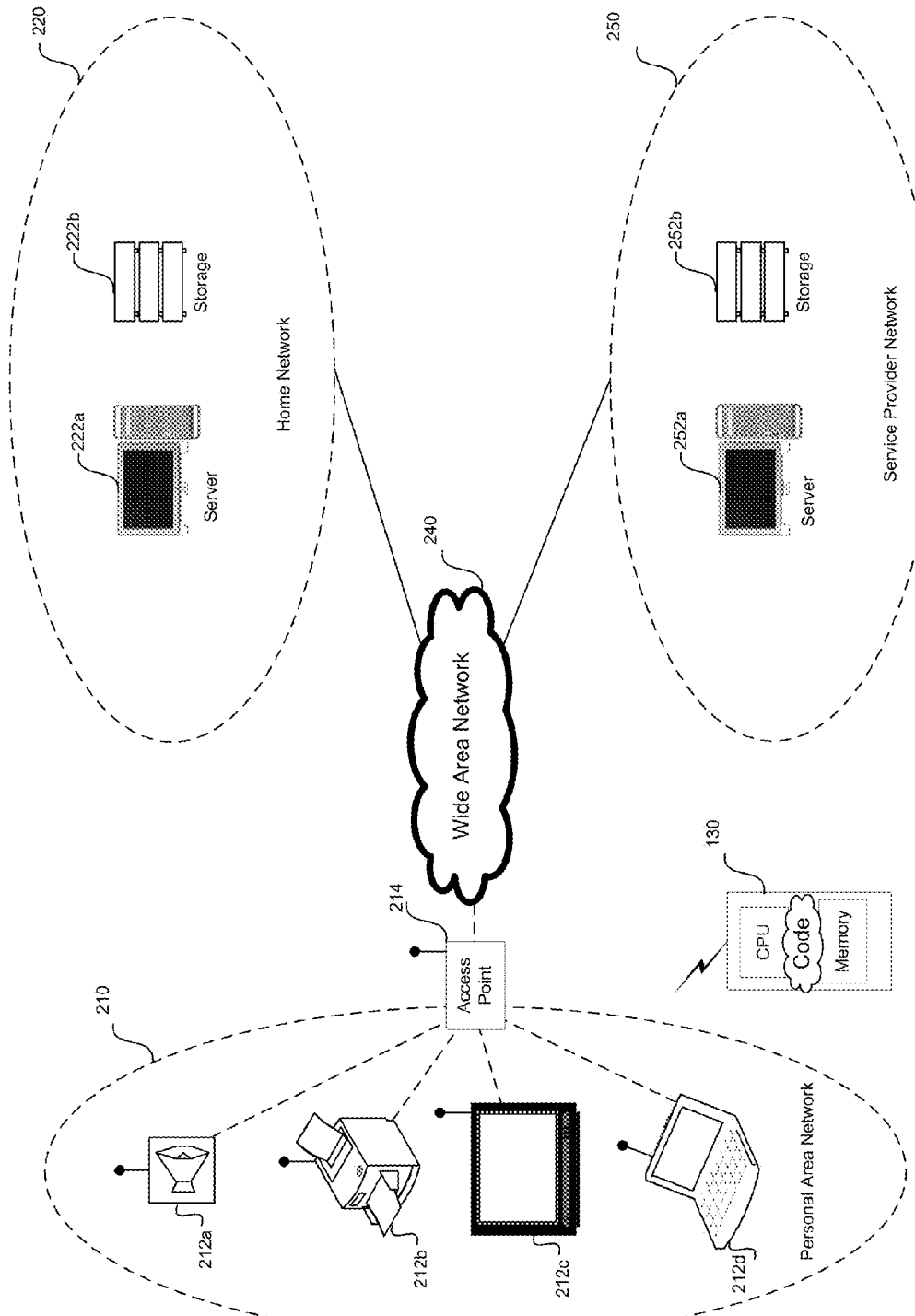
FIG. 2A is a block diagram of an exemplary ad hoc network comprising a home network a service network a personal area network (PAN) and a handheld wireless communication device.

FIG. 2A is a block diagram of an exemplary dynamic and secure ad hoc network that may be utilized for transferring electronic media content, in accordance with an embodiment of the invention. Referring to FIG. 2A there is shown a handheld wireless communication device (HWCD) 130, a personal area network (PAN) 210, four content rendering devices 212a, 212b, 212c and 212d, a wireless local area network (WLAN) access point (AP) 214, a home network 220 with a server 222a and storage 222b, a service provider network 250 with a server 252a and storage 252b and a wide area network 240.

The HWCD 130 may be communicatively coupled with electronic media content rendering devices 212a, 212b, 212c and/or 212d within the personal area network (PAN) 210 via for example a Bluetooth connection or a WLAN connection via AP 214. Other types of suitable communication technologies not shown in FIG. 2A may link the HWCD 130 to local content rendering devices for example 212a, 212b, 212c and/or 212d.

The HWCD 130 may be communicatively coupled with the home network 220 and/or the service provider network 250 as described in FIG. 1, link network 106. In this regard, the HWCD 130 may, for example, access the wide area network 240 via a local wireless access point (AP) or any other suitable wireless technology such as cellular and/or or satellite communication.

The personal area network (PAN) 210 may comprise attributes similar to those described in FIG. 1 target electronic media content rendering devices 110. In this regard, PAN 210 may comprise a speaker 212a, a printer 212b, a high definition or standard definition video display 212c and/or a personal computer 212d. The personal area network 210 devices may be communicatively coupled with the home network 220 and or the service network 250 via the wide area network 240.

Communication between the WAN 240 and the HWCD 130, the speaker 212a, the printer 212b, the high or standard definition video display 212c and/or the personal computer 212d may be enabled via the AP 214. In addition the 214 may enable communication between the HWCD 130 and devices 212a, 212b, 212c and/or 212d when the HWCD 130 is within WLAN range of the AP 214.

The home network 220 may comprise suitable logic, circuitry and or code to act as a source of secure or unprotected electronic media content 120 as described for FIG. 1. The home network 220 may comprise a server or personal computer 222a with suitable processing capacity and/or storage 222b for supporting the dynamic and secure ad hoc network transmissions and data processing tasks. The home network 220 may store a specified user's own content or content the specified user has permission to access. In addition, the home network 220 is not limited to any specific electronic media devices. In this regard, the home network may for example comprise a laptop, a DVD recorder or other electronic media recorder, a digital still or video camera, an electronic keyboard and/or a microphone. The home network may be communicatively coupled with the PAN 210, the HWCD 130 and the service provider network 250 via the wide area network 240.

The service provider network 250 may comprise suitable logic, circuitry and or code to act as a source of secure or unprotected electronic media content 120 as described for FIG. 1. The service provider network 250 may comprise a server or personal computer 252a with suitable processing capacity and/or storage 252b for supporting the dynamic and secure ad hoc network transmissions and data processing tasks. The service provider network 250 may store a specified user's owned content or content the specified user has permission to access. In addition, the service provider network 250 is not limited to any specific electronic media devices and may comprise any suitable device for storing, processing and transmitting electronic media content over the dynamic and secure ad hoc network. The service provider network 250 may be communicatively coupled with the home network 220, the PAN 210 and the HWCD 130 via the wide area network 240.

The wide area network (WAN) 240 may comprise a plurality of interconnecting networks with suitable logic, circuitry and/or code that may enable dynamic and secure communication between the home network 220 and the PAN 260 via one or more base stations 270a and 270b. The WAN 240 may comprise any suitable network that may be accessible to the general public and/or may comprise one or more proprietary networks with protected access. The WAN 240 may comprise wireless and/or wire-line links and may support a variety of communication technologies and protocols suitable for voice, video and/or audio data communication.

In operation, the HWCD 130 may enable configuration of a dynamic and secure ad hoc network wherein devices within the local personal area network (PAN) 210 that may be located remotely from the home network 220, may act as an extension of the home network 220 and/or an extension of the remote service provider network 250. In this regard, a specified user who may own or have permission to access media content on the home network 220 and/or service provider network 250, may render protected electronic media content on a remote resource without violating media rights and/or licensing agreements. In one exemplary usage scenario, a specified user and the user's HWCD 130 may be located away from the user's home network 220. The HWCD 130 may support for example, Bluetooth and/or WLAN radio technology. In this regard, the specified user may be located in friend's home for example, within range of PAN 210 comprising a video display 212c enabled to support Bluetooth connections. In addition the local environment may comprise a WLAN access point (AP) 214. The specified user may wish to display media content, on the local video display 212c, a video file that may be stored within the specified user's home network 220. The specified user may utilize the HWCD 130 within the local environment to configure a dynamic and secure ad hoc network between the video display 212c and the specified user's remote home network 220. In this regard, the video display 212c may become an extension of the user's home network 220.

The HWCD 130 may establish a PAN connection with the video display 212c. In addition, the HWCD 130 may establish a WLAN connection with the AP 214 and access the home network 220 via the WAN 240. The specified user and/or the HWCD 130 may be authenticated by the home network 220. The HWCD 130 may assign processing tasks for example data format translation for the electronic media content file to a computer within the home network 220 for example. Moreover, the HWCD may determine routing for the electronic media content file from the home network 220 to the video display 212c. In one embodiment of the invention, the electronic media content file may be routed from the user's home network 220, over the WAN 240 to the AP 214 and then via a WLAN connection to the video display 212c for example. In another embodiment of the invention, the electronic media content file may be routed over the WAN 240 to the AP 214 and then via a WLAN connection to the HWCD 130. In this regard, the HWCD may transmit the electronic media content file to the video display 212c via a Bluetooth connection within PAN 210, During data transmission, the remote and/or local resources may buffer data, utilize multiple streams and/or reach-ahead to expedite the transmission of data as afforded by available network bandwidth. The rate of transmission may be converted to a rate compatible with the HWCD and or the video display 262. The user may then play the electronic media content on the video display 212c without violating electronic media rights and/or licensing agreements.

In another usage scenario, the HWCD 130 may be located in a region local to the home network 220, the server 222a and memory 222b. Electronic media content that may be protected by Digital Rights Management (DRM) for example, or another access control technology, may be stored in the memory 222b. The user may have permission to access and render the stored electronic media content on the server 222a. In this regard, the HWCD 130 may establish a connection via Bluetooth or WLAN for example with the home network 220 and may be utilized to direct the server 222a to access and process the protected electronic media for display. In this regard, rather than directing the media content to a display attached to the server 222a, the electronic media content may be directed or streamed to the HWCD 130 display via the Bluetooth or WLAN connection for example.

Figure 2B:
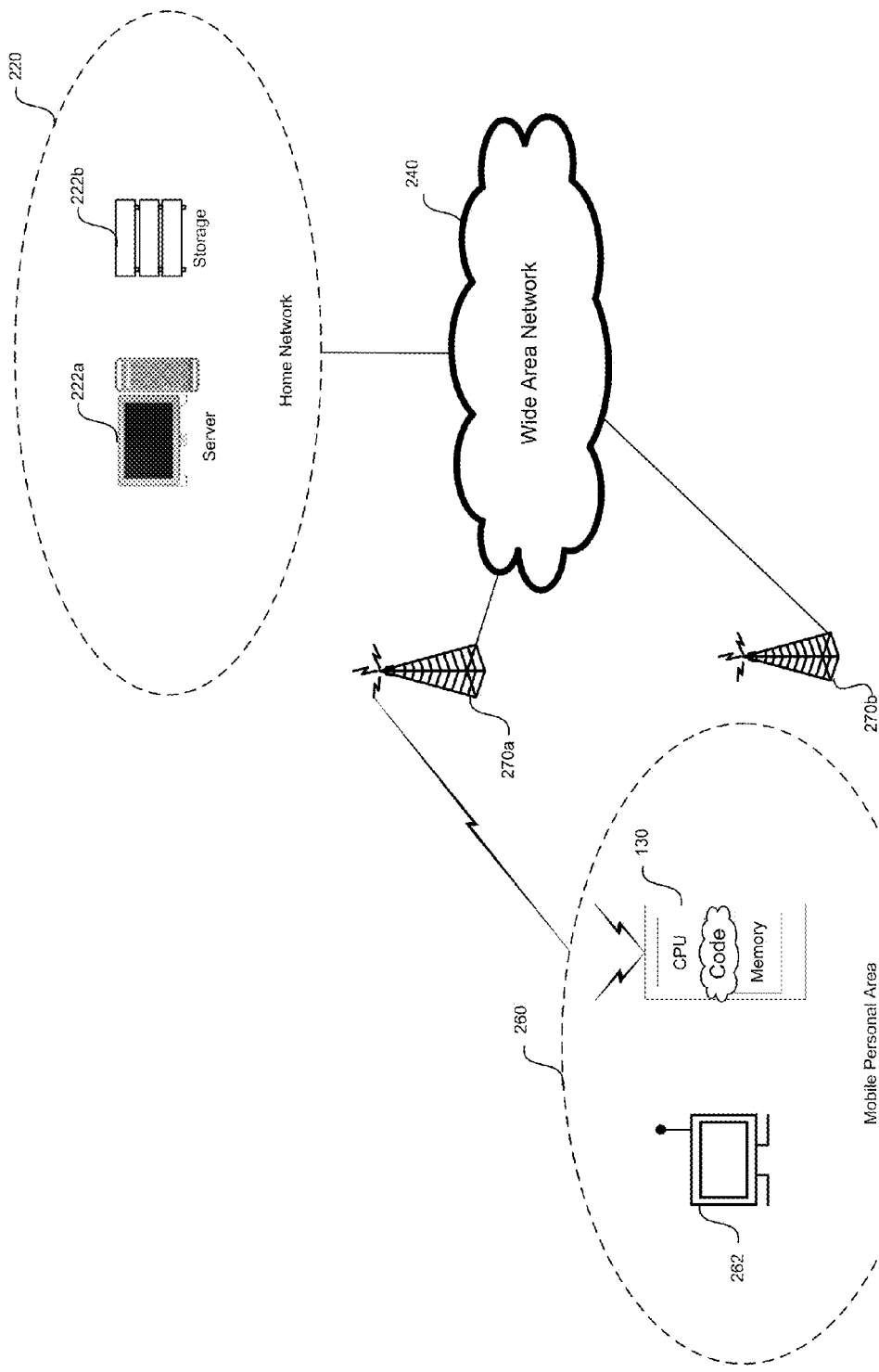
FIG. 2B is a block diagram of an exemplary ad hoc network comprising a mobile PAN, a home network and a handheld wireless communication device.

FIG. 2B is a block diagram of an exemplary dynamic and secure ad hoc network that may be utilized for transferring electronic media content in accordance with an embodiment of the invention. Referring to FIG. 2B there is shown a handheld wireless communication device (HWCD) 130, a mobile personal area network (PAN) 260, a portable video display 262, a home network 220 a server 222a, storage 222b and two cellular base stations 270a and 270b.

The HWCD 130 device and functionality was described in FIG. 1. The HWCD 130 may be communicatively coupled via a PAN network 260, for example Bluetooth, with the portable video display 262. In addition, the HWCD 130 may be communicatively coupled with the home network 220 via one or more cellular base stations 270a and 270b, and the WAN 240. Communication technologies utilized to communicatively couple the HWCD 130 are not limited to the ones mentioned here. Other types of suitable communication technologies not shown in FIG. 2B may be utilized between a source of electronic media content 120 for example the home network 220 and a target electronic media rendering device 110, for example the portable video display 262.

The mobile PAN 260 may comprise attributes similar to those described in FIG. 1, target electronic media content rendering device 110. In this regard, PAN 260 may comprise video display 262 and the HWCD 130. The personal area network 260 may be communicatively coupled with the home network 220 via the HWCD 130, one or more cellular base stations 270a and 270b and/or the WAN 240. In another embodiment of the invention, the PAN 260 may be communicatively coupled with a service provider network. For example, the service provider network 250 shown in FIG. 2A, may be communicatively coupled with the HWCD 130 via one or more cellular base stations 270a and 270b and/or the WAN 240.

The home network 220 is described in FIG. 2A block 220 and may comprise a server 222a and storage 222b. The home network 220 may be communicatively coupled with the mobile PAN 260 via the WAN 240 and base stations 270a and 270b.

The WAN 240 is substantially described with respect to FIG. 2A and may be communicatively coupled with the home network 220 and the PAN 260 via one or more base stations 270a and 270b.

The base stations 270a and 270b may comprise suitable logic, circuitry and/or code to set-up and maintain a connection with the wireless device HWCD 130. The base stations 270a and/or 270b may be part of a system that enables handoff of the HWCD 130 from one or more base stations to one or more alternative base stations while supporting data communication between the home network 220 and the mobile PAN 260 for the duration of data transfer. The base stations may be part of a mobile terrestrial, air to ground and/or satellite system and may be communicatively coupled with other systems such as WLAN for example in between the base stations 270a and 270b and the HWCD 130. The base stations may operate on any suitable frequency available for wireless communication. In addition the base stations 270a and 270b may be communicatively coupled with the WAN 240 via any suitable transport media, switching facilities and/or gateway technology available to support secure and reliable audio, video and/or voice communication.

In operation, the HWCD 130 may enable configuration of a dynamic and secure ad hoc network wherein devices within the local personal area network (PAN) 210 that may be located remotely from the home network 220, may act as an extension of the home network 220 and/or an extension of a remote service network as shown in FIG. 2A, block 250. In this regard, a specified user who may own or have permission to access content on the home network 220, may render protected electronic media content on a remote resource without violating media rights and/or licensing agreements. In one exemplary usage scenario, a specified user and the user's HWCD 130 may be located away from the user's home network 220.

The HWCD 130 may support for example, Bluetooth and/or WLAN radio technology. In this regard, the specified user may be located in a moving vehicle for example a plane or a car and may be within range of one or more devices enabled to support a PAN or WLAN connection for example a Bluetooth connection. The HWCD 130 may be within range of the portable video display 262 enabled to support one or more network connections, for example, a Bluetooth connection. The specified user may wish to render, on the local video display 262, a video file for example, that may be stored within the specified user's home network 220. The specified user may utilize the HWCD 130 within the local environment to configure a dynamic and secure ad hoc network between the video display 262 and the specified user's remote home network 220. In this regard, the video display 262 may act as an extension of the user's home network 220.

The HWCD 130 may establish a connection with the video display 262, for example, a PAN or WLAN. In addition, the HWCD 130 may access the home network 220 via a connection with one or more base stations 270a and 270b directly or via a WLAN connection and the WAN 240. The specified user and/or the HWCD 130 may be authenticated by the home network 220. The HWCD 130 may assign processing tasks to itself or other resources. For example, data format translation for the electronic media content file may be assigned to the server 222a and storage 222b within the home network 220. Moreover, the HWCD may determine routing for the electronic media content file between the home network 220 and the video display 212c. In one embodiment of the invention, the electronic media content file may be routed from the user's home network 220, over the WAN 240 to one or more of the base stations 270a and 270b and then via one or more wireless connections to the video display 262 for example.

In another embodiment of the invention, the electronic media content file may be routed from the user's home network 220, over the WAN 240 to one or more of the base stations 270a and 270b and then via one or more wireless connections to the HWCD 130. In this regard, the HWCD 130 may transmit the electronic media content file to the video display 262 via a Bluetooth connection within PAN 260. During transmission of the electronic media content, the remote and/or local resources may buffer data, utilize multiple streams and/or may reach-ahead to expedite the transmission of data as afforded by available network bandwidth. The rate of transmission may be converted to a rate compatible with the HWCD 130 and or the video display 262. The user may then play the electronic media content on the video display 262 without violating electronic media rights and/or licensing agreements.

Figure 3:
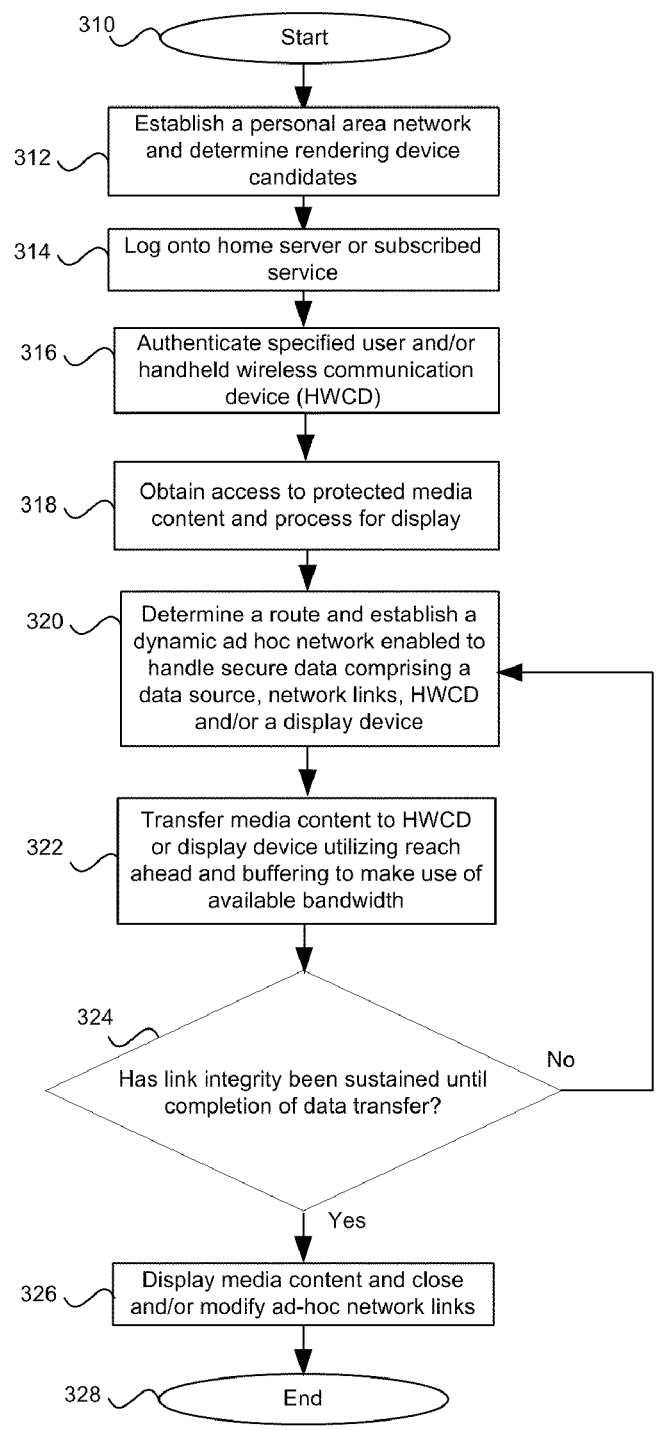
FIG. 3 is a flow diagram illustrating exemplary steps for establishing an ad hoc network via a handheld wireless communication device, transferring media content over the dynamic and secure ad hoc network and rendering the media content on a remote networked device.

FIG. 3 is a flow chart illustrating exemplary steps for transferring electronic media content via a dynamic and secure ad hoc network, in accordance with an embodiment of the invention. Referring to FIG. 3, after start step 310, in step 312 a user may initiate a process for rendering electronic media content within a local environment. The electronic media content may be owned by the user or the user may have permission to access it. Utilizing a handheld wireless communication device (HWCD) 130 shown in FIGS. 2A and 2B, a personal area network (PAN) or wireless local area network (LAN) comprising local resources enabled to process and/or render the electronic media content, may be established. The HWCD 130 may select a resource for rendering the electronic media content and discover its capabilities and requirements for receiving, processing, storing and rendering the electronic media.

In step 314, the HWCD 130 may access a source of electronic media content 120 for example the home network 220 or the service provider network 250. The home network 220 and/or service provider network 250 may comprise the user's personal system preferences and settings. In step 316, the source of electronic media content 120 for example the home network 220 and/or service provider network 250, may authenticate the user and/or the HWCD 130. In step 318, the HWCD 130 may determine processing needed to adapt the electronic media content for receiving and rendering on the selected resource. The HWCD 130 may assign processing tasks to available resources within the local network or a remote network, for example: data format conversion, security treatment and/or transport rate adaptation.

In step 320, the HWCD 130 may determine a route and establish a secure and dynamic ad hoc network comprising the source of electronic media content 120, the target electronic media content rendering device 110, the HWCD 130 and suitable network communication links shown in FIG. 1. In step 322, electronic media content may be transferred to the target electronic media content rendering device 110. According to bandwidth availability, data may be transferred at an accelerated effective rate via single or multiple streams and buffered within the secure ad hoc network. In step 324, the process may proceed to step 324 if network link integrity has been sustained and/or transfer of the electronic media content is complete. In step 326, the electronic media content may be rendered on the terminating device and the secure ad hoc network may be closed or modified. Step 328 is an end step. In step 324, if network link integrity has failed or disengaged, the HWCD 130 may be enabled to dynamically establish a new or modified secure ad hoc network or user intervention may be utilized. Proceed to step 320.

In one embodiment of the invention, a handheld wireless communication device (HWCD) 130 may be utilized in determining networked resources that may enable processing of data for a specified user. The determined network resources may comprise the HWCD 130, the source of electronic media content 120, one or more transport links 102, 104 and/or 106 and a terminating element 110 shown in FIG. 1. In addition, the HWCD 130 may be utilized to establish a dynamic and secure network configuration among one or more of the determined network resources for the specified user. The dynamic and secure network configuration may be operated according to the specified user's preferences.

The data may be access protected and the specified user may have access rights via the established dynamic and secure network configuration. Obtaining access to the data may require complying with security operations for example authentication of the specified user and/or the HWCD, for the data source and/or the protected data.

The HWCD 130 may enable determining one or more processing operations needed for the data and may assign the data processing tasks to the available networked resources. For example, the format of the data may be converted by the source of electronic media content 120 to a format compatible with the terminating element 110. The data throughput may be adapted according to available network bandwidth. For example multiple streams and reach ahead may be utilized to improve throughput. Accordingly, the data may be buffered. One or more transport links may be established until transfer of the data may be complete. The data may be consumed. For example the data may be rendered on the terminating element 110 or the HWCD 130.

In one embodiment of the invention, a method for data communication may comprise creating an ad hoc network enabled to handle secure data for a specified user via a handheld wireless communication device (HWCD) 130 shown in FIG. 2A. The user of the handheld wireless communication device (HWCD) 130 may be verified and/or authenticated. The ad hoc network enabled to handle secure data may extend rightful access to data that may be protected and stored on one or more networked devices to one or more distributed rendering devices. For example the rightful access to data stored on the server 222a and the storage 222b, may be extended to one or more distributed rendering devices 212a, 212b, 212c and/or 212d. The HWCD and/or the user may be authenticated and/or subject to security operations of the one or more networked devices when obtaining access to the data stored therein.

The HWCD 130 may enable configuration of one or more dynamic connections that enable communication via the ad hoc network enabled to handle secure data. The connections may be re-configured as needed until the communication of data is complete. Bandwidth and throughput of the one or more communication links may be adjusted according to bandwidth availability. Moreover, the data may be buffered via the HWCD and/or one or more of the distributed rendering devices.

Processing of the data may be assigned amongst the one or more networked resources that are communicatively coupled via the ad hoc network enabled to handle secure data. The data may be converted from its current format to a format suitable for rendering and/or consumed on the one or more distributed rendering devices via control by the HWCD.

Certain embodiments of the invention may comprise a machine-readable storage having stored thereon, a computer program having at least one code section for enabling rendering of electronic media content via a secure ad hoc network configuration utilizing a handheld wireless communication device, the at least one code section being executable by a machine for causing the machine to perform one or more of the steps described herein.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for data communication, the method comprising:

creating via a handheld wireless communication device (HWCD) and for a specified user, an ad hoc network enabled to handle secure data that extends to one or more distributed rendering devices rightful access to data stored on one or more networked devices; and adjusting via said HWCD, bandwidth of one or more communication links utilized by said ad hoc network enabled to handle secure data based on bandwidth availability.

2. The method according to claim 1, comprising configuring via said HWCD, one or more connections that enable communication via said ad hoc network enabled to handle secure data.

3. The method according to claim 2, wherein said configuring of said one or more connections occurs dynamically via said HWCD.

4. The method according to claim 1, comprising adjusting via said HWCD, throughput of one or more data streams handled by said one or more communication links based on said bandwidth availability.

5. The method according to claim 1, comprising buffering said data via said HWCD and/or said one or more distributed rendering devices.

6. The method according to claim 1, comprising controlling via said HWCD, consumption of said data by said one or more distributed rendering devices and/or said HWCD.

7. A method for data communication, the method comprising:
creating via a handheld wireless communication device (HWCD) and for a specified user, an ad hoc network enabled to handle secure data that extends to one or more distributed rendering devices rightful access to data stored on one or more networked devices; and
converting via said HWCD, said data from its current format to a format suitable for rendering on said one or more distributed rendering devices.

8. A method for data communication, the method comprising:
creating via a handheld wireless communication device (HWCD) and for a specified user, an ad hoc network enabled to handle secure data that extends to one or more distributed rendering devices rightful access to data stored on one or more networked devices; and
assigning one or more tasks that enable processing of said data amongst one or more of networked resources communicatively coupled via said ad hoc network enabled to handle secure data.

9. A method for data communication, the method comprising:
creating via a handheld wireless communication device (HWCD) and for a specified user, an ad hoc network enabled to handle secure data that extends to one or more distributed rendering devices rightful access to data stored on one or more networked devices, wherein said data comprises protected media content.

10. A method for data communication, the method comprising:
creating via a handheld wireless communication device (HWCD) and for a specified user, an ad hoc network enabled to handle secure data that extends to one or more distributed rendering devices rightful access to data stored on one or more networked devices; and
re-configuring via said HWCD, one or more connections that enable communication via said ad hoc network enabled to handle secure data until said data communication is complete.

11. A method for data communication, the method comprising:
creating via a handheld wireless communication device (HWCD) and for a specified user, an ad hoc network enabled to handle secure data that extends to one or more distributed rendering devices rightful access to data stored on one or more networked devices; and
obtaining said access to data stored on said one or more networked devices via said HWCD according to authentication and/or security operations of said one or more networked devices.

12. A system for data communication, the system comprising:
one or more processors utilized in a HWCD, wherein said one or more processors are operable to establish for a specified user, an ad hoc network enabled to handle secure data that extends to one or more distributed rendering devices rightful access to data stored on one or more networked device; and
adjust via said HWCD, bandwidth of one or more communication links utilized by said ad hoc network enabled to handle secure data based on bandwidth availability.

13. The system according to claim 12, wherein said one or more processors utilized in said HWCD are operable to configure via said HWCD, one or more connections that enable communication via said ad hoc network enabled to handle secure data.

14. The system according to claim 13, wherein said configuring of said one or more connections occurs dynamically via said HWCD.

15. The system according to claim 12, wherein said one or more processors utilized in said HWCD are operable to adjust via said HWCD, throughput of one or more data streams handled by said one or more communication links based on said bandwidth availability.

16. The system according to claim 12, wherein said one or more processors utilized in said HWCD are operable to buffer said data via said HWCD and/or said one or more distributed rendering devices.

17. The system according to claim 12, wherein said one or more processors utilized in said HWCD are operable to control via said HWCD, consumption of said data by said one or more distributed rendering devices and/or said HWCD.

18. A system for data communication, the system comprising:
one or more processors utilized in a HWCD, wherein said one or more processors are operable to establish for a specified user, an ad hoc network enabled to handle secure data that extends to one or more distributed rendering devices rightful access to data stored on one or more networked device; and
convert via said HWCD, said data from its current format to a format suitable for rendering on said one or more distributed rendering devices.

19. A system for data communication, the system comprising:
one or more processors utilized in a HWCD, wherein said one or more processors are operable to establish for a specified user, an ad hoc network enabled to handle secure data that extends to one or more distributed rendering devices rightful access to data stored on one or more networked device; and
assign one or more tasks that enable processing of said data amongst one or more of networked resources communicatively coupled via said ad hoc network enabled to handle secure data.

20. A system for data communication, the system comprising:
one or more processors utilized in a HWCD, wherein said one or more processors are operable to establish for a specified user, an ad hoc network enabled to handle secure data that extends to one or more distributed rendering devices rightful access to data stored on one or more networked device, wherein said data comprises protected media content.

21. A system for data communication, the system comprising:
one or more processors utilized in a HWCD, wherein said one or more processors are operable to establish for a specified user, an ad hoc network enabled to handle secure data that extends to one or more distributed rendering devices rightful access to data stored on one or more networked device; and re-configure via said HWCD, one or more connections that enable communication via said ad hoc network enabled to handle secure data until said data communication is complete.

22. A system for data communication, the system comprising:
- one or more processors utilized in a HWCD, wherein said one or more processors are operable to establish for a specified user, an ad hoc network enabled to handle secure data that extends to one or more distributed rendering devices rightful access to data stored on one or more networked device; and
- obtain said access to data stored on said one or more networked devices via said HWCD according to authentication and/or security operations of said one or more networked devices.

23. A non transitory machine readable storage having stored thereon, a computer program having at least one code section for communicating information, the at least one code section being executable by a machine for causing the machine to perform steps comprising:
- creating via a handheld wireless communication device (HWCD) and for a specified user, an ad hoc network enabled to handle secure data that extends to one or more distributed rendering devices rightful access to data stored on one or more networked devices; and
- adjusting via said HWCD, bandwidth of one or more communication links utilized by said ad hoc network enabled to handle secure data based on bandwidth availability.

24. The non transitory machine-readable storage according to claim 23, wherein said at least one code section comprises code for configuring via said HWCD, one or more connections that enable communication via said ad hoc network enabled to handle secure data.

25. The non transitory machine-readable storage according to claim 24, wherein said at least one code section comprises code wherein said configuring of said one or more connections occurs dynamically via said HWCD.

26. The non transitory machine-readable storage according to claim 23, wherein said at least one code section comprises code for adjusting via said HWCD, throughput of one or more data streams handled by said one or more communication links based on said bandwidth availability.

27. The non transitory machine-readable storage according to claim 23, wherein said at least one code section comprises code for buffering said data via said HWCD and/or said one or more distributed rendering devices.

28. The non transitory machine-readable storage according to claim 23, wherein said at least one code section comprises code for controlling via said HWCD, consumption of said data by said one or more distributed rendering devices and/or said HWCD.

29. A non transitory machine readable storage having stored thereon, a computer program having at least one code section for communicating information, the at least one code section being executable by a machine for causing the machine to perform steps comprising:
- creating via a handheld wireless communication device (HWCD) and for a specified user, an ad hoc network enabled to handle secure data that extends to one or more distributed rendering devices rightful access to data stored on one or more networked devices; and
- converting via said HWCD, said data from its current format to a format suitable for rendering on said one or more distributed rendering devices.

30. A non transitory machine readable storage having stored thereon, a computer program having at least one code section for communicating information, the at least one code section being executable by a machine for causing the machine to perform steps comprising:
- creating via a handheld wireless communication device (HWCD) and for a specified user, an ad hoc network enabled to handle secure data that extends to one or more distributed rendering devices rightful access to data stored on one or more networked devices; and
- assigning one or more tasks that enable processing of said data amongst one or more of networked resources communicatively coupled via said ad hoc network enabled to handle secure data.

31. A non transitory machine readable storage having stored thereon, a computer program having at least one code section for communicating information, the at least one code section being executable by a machine for causing the machine to perform steps comprising:
- creating via a handheld wireless communication device (HWCD) and for a specified user, an ad hoc network enabled to handle secure data that extends to one or more distributed rendering devices rightful access to data stored on one or more networked devices, wherein said data comprises protected media content.

32. A non transitory machine readable storage having stored thereon, a computer program having at least one code section for communicating information, the at least one code section being executable by a machine for causing the machine to perform steps comprising:
- creating via a handheld wireless communication device (HWCD) and for a specified user, an ad hoc network enabled to handle secure data that extends to one or more distributed rendering devices rightful access to data stored on one or more networked devices; and
- configuring via said HWCD, one or more connections that enable communication via said ad hoc network enabled to handle secure data until said data communication is complete.

33. A non transitory machine readable storage having stored thereon, a computer program having at least one code section for communicating information, the at least one code section being executable by a machine for causing the machine to perform steps comprising:
- creating via a handheld wireless communication device (HWCD) and for a specified user, an ad hoc network enabled to handle secure data that extends to one or more distributed rendering devices rightful access to data stored on one or more networked devices; and
- obtaining said access to data stored on said one or more networked devices via said HWCD according to authentication and/or security operations of said one or more networked devices.

* * * * *